(12) United States Patent
Xia

(10) Patent No.: US 9,100,317 B1
(45) Date of Patent: Aug. 4, 2015

(54) SELF SURVEYING PORTABLE SENSOR NODES

(71) Applicant: Ying H. Xia, Saunderstown, RI (US)

(72) Inventor: Ying H. Xia, Saunderstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 140 days.

(21) Appl. No.: 14/090,386

(22) Filed: Nov. 26, 2013

(51) Int. Cl.
*H04L 1/00* (2006.01)
*H04L 12/24* (2006.01)

(52) U.S. Cl.
CPC ..................................... *H04L 41/12* (2013.01)

(58) Field of Classification Search
None
See application file for complete search history.

(56) References Cited

U.S. PATENT DOCUMENTS

| | | | | |
|---|---|---|---|---|
| 5,554,994 | A | * | 9/1996 | Schneider ................ 342/357.27 |
| 7,468,697 | B2 | * | 12/2008 | Matsuoka et al. ............ 342/464 |
| 7,483,403 | B2 | * | 1/2009 | Herrmann et al. ............ 370/310 |
| 2013/0316728 | A1 | * | 11/2013 | Bradley ..................... 455/456.1 |

* cited by examiner

*Primary Examiner* — Frank Duong
(74) *Attorney, Agent, or Firm* — James M. Kasischke; Michael P. Stanley

(57) ABSTRACT

A self-surveying range includes a base station and a plurality of nodes. Each node has a transmitter, a receiver and a processor and is capable of transmitting a signal encoded with a node identifier, the transmission time. The node can also receive transmitted signals from other nodes. The base station also has a transmitter, a receiver and a processor. The base station is capable of determining its location, transmitting an encoded signal with the transmission time and receiving transmitted signals from said plurality of nodes at a definite time. The base station processor can determine the location of each node from the base station location, the node transmission time and the definite reception time. There is further provided a method for establishing a self-surveying range.

14 Claims, 3 Drawing Sheets

SELF SURVEYING PORTABLE SENSOR NODES

STATEMENT OF GOVERNMENT INTEREST

The invention described herein was made in the performance of official duties by one or more employees of the Department of the Navy, and the invention herein may be manufactured, practiced, used, and/or licensed by or for the Government of the United States of America without the payment of any royalties thereon or therefor.

CROSS REFERENCE TO OTHER PATENT APPLICATIONS

None.

BACKGROUND OF THE INVENTION (1) Field of Invention

The present invention generally relates to surveying portable sensor nodes.

(2) Description of the Prior Art

Acoustic underwater ranges often use a pinger-based system for localization and tracking. This system involves an acoustic device being tracked that sends out a regular encoded acoustic signal known as a ping that can be received by hydrophones positioned at known locations. Incoming acoustic energy from a ping is received by the hydrophones and transmitted to digital signal processing nodes. These processors turn raw acoustic data into time-tagged detection report information. This detection report includes the ping's encoded frequency, ping encoding type, ping index, time of arrival of each ping, and the receiving hydrophone. Other information can also be included. A tracking software system receives all the detection reports relevant to a particular target over all the hydrophones on the range. Using the known position of those hydrophones, the environmental data and iterative numerical algorithms, the software produces a candidate location and time of emission for the received ping.

Some surveying systems employ a marine vehicle with transponders to send out signals and detect echoes as it passes by objects in the water. Portable ranges are known that are self-contained training systems embedded with bottom mounted transponders. These portable ranges include multiple bottom mounted transponders and a surface link to a support vessel and the necessary shipboard systems. A basic portable range operational configuration consists of an array of seven bottom-moored transponders, and a range support vessel having a shipboard processing unit and a satellite link to a shore-based remote display center. The bottom moored transponders must be emplaced at known locations. The transponders detect tracking signals emitted from the exercise participants and transmit data via an acoustic data uplink. The transmission can be received by a dunking head hydrophone suspended from the range support vessel. The shipboard processing unit processes the data and generates a detection report in a format compatible with the tracking software. The shipboard processing unit can also control and monitor the status of the transponders through acoustic commands.

The above mentioned methods of establishing a range incur high logistical costs and time because of the requirement that the bottom mounted transducers be emplaced at known locations. Therefore, there is a need for an underwater range having self-surveying portable sensor nodes and a base unit that can determine their locations with minimal outside support.

SUMMARY OF THE INVENTION

A first object of is to provide a portable underwater acoustic range that can configure itself with minimal outside interaction;

A second object is to provide a portable range that has sensor nodes that can be deployed without exact locational positioning.

Accordingly, there is provided a portable acoustic range that includes a base station and a plurality of nodes. Each node has a transmitter, a receiver and a processor and is capable of transmitting a signal encoded with a node identifier, the transmission time and receiving transmitted signals from other nodes. The base station also has a transmitter, a receiver and a processor. The base station is capable of determining its location, transmitting an encoded signal with the transmission time and receiving transmitted signals from said plurality of nodes at a definite time. The base station processor can determine the location of each node from the base station location, the node transmission time and the definite reception time.

There is also provided a method for providing a self-surveying range that includes deploying a plurality of nodes and a base station. The base station and each of the nodes is capable of transmitting and receiving a signal. The location of the base station is obtained, and times are synchronized among the deployed nodes. A signal is transmitted by each node having a transmission time and a node identifier. The transmitted signals are received by all of the other nodes and the base station. Distances between the nodes are calculated and node geometry is determined. Ranges between the base station and each of the nodes is further calculated. The base station ranges and the base station location is used to calculate the node locations. In further embodiments, the node location calculations can be refined by dropping distance measurements having the largest apparent error.

BRIEF DESCRIPTION OF THE DRAWINGS

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

Figure 1:
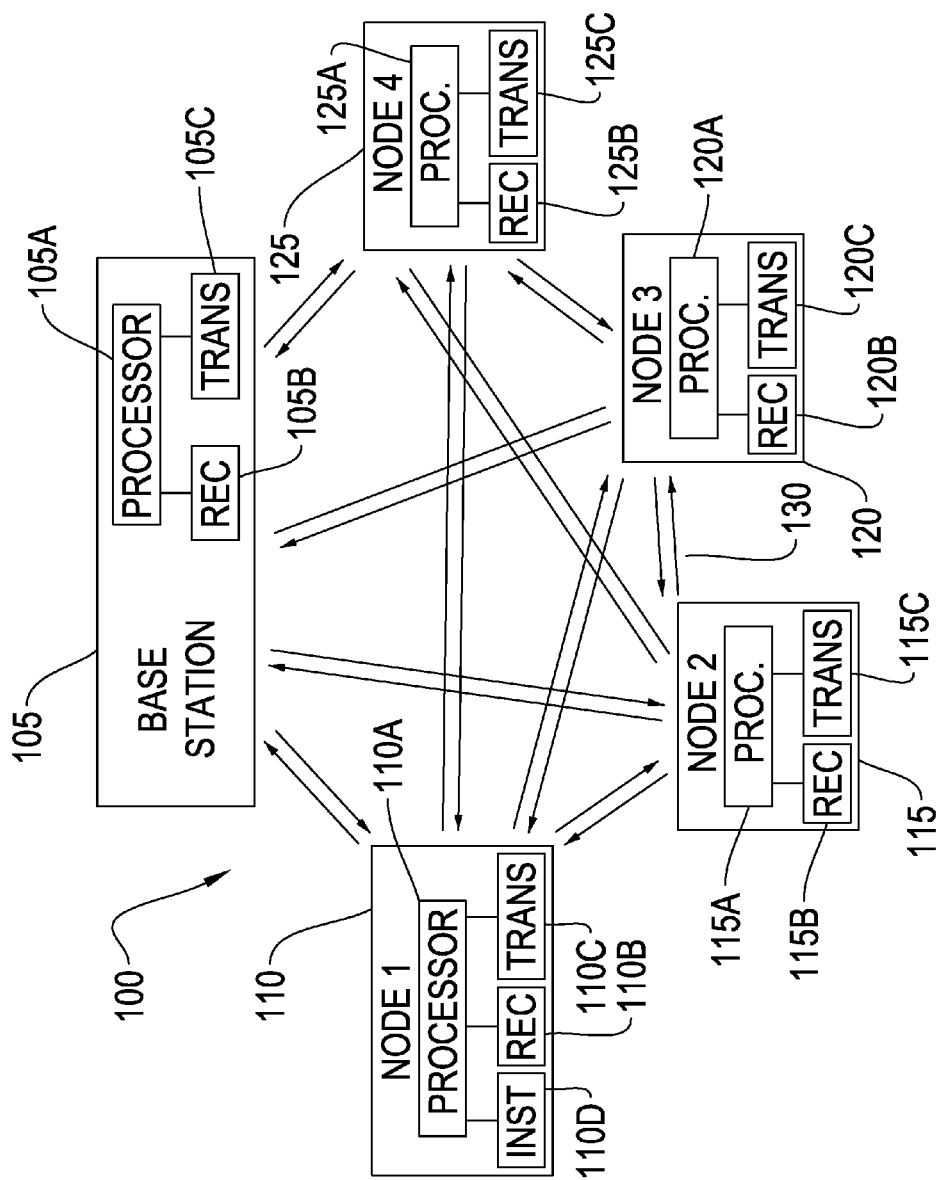
FIG. 1 is a block diagram of a system including a base station with sensor nodes according to an exemplary embodiment of the invention.

FIG. 1 is a block diagram of a self-surveying range system 100 including a base station 105, a first sensor node 110, a second sensor node 115, a third sensor node 120, and a fourth sensor node 125. The base station 105 can be located on a vessel, a structure or an aircraft, for example. Preferably, base station 105 can establish its global coordinates by way of a global positioning system (GPS) or some other means. Base station has an associated processor 105A joined to a receiver 105B and a transmitter 105C. Likewise, each of the sensor nodes 110, 115, 120, and 125 has an associated processor 110A, 115A, 120A and 125A, an associated receiver 110B, 115B, 120B and 125B, and a transmitter 110C, 115C, 120C and 125C. At least one sensor node can have instruments 110D for detecting sound velocity as will be discussed hereinafter. Each transmitter is typically an acoustic transducer that can transmit signals such as an acoustic pulse. The acoustic pulse can be encoded with additional information by means known in the art. Each receiver can be a hydrophone or other device capable of receiving the transmitted signals. The processors can be a digital computer joined to a digital storage device such as volatile or non-volatile memory. Each processor is joined to a transmitter and receiver for providing and receiving signals and converting the signals into digital data. Each processor should also have a clock capable of providing an accurate time signal. The sensor nodes 110, 115, 120, and 125 are typically submersible and are deployed underwater by an aircraft or surface craft in an arbitrary two dimensional area. Arrows 130 between the sensor nodes 110, 115, 120, and 125 and the base station 105 illustrate communication, such as acoustic signals. The sensor nodes 110, 115, 120 and 125 can be configured to send signals underwater, by, for example, a transducer, and receive signals to one another underwater, by, for example, a hydrophone.

The base station processor 105A can be configured to calculate a location of each of the sensor nodes 110, 115, 120 and 125 based on distances between each of the sensor nodes 110, 115, 120 and 125 and each other and also based on distances between each of the sensor nodes 110, 115, 120, and 125 the base station 105. The distances between each two nodes are calculated based on the transmit time and detection time of a sonar signal from one of the sensor nodes 110, 115, 120, and 125 to another node. The distances between the base station 105 and sensor nodes 110, 115, 120 and 125 can also be calculated in this manner.

Figure 2:
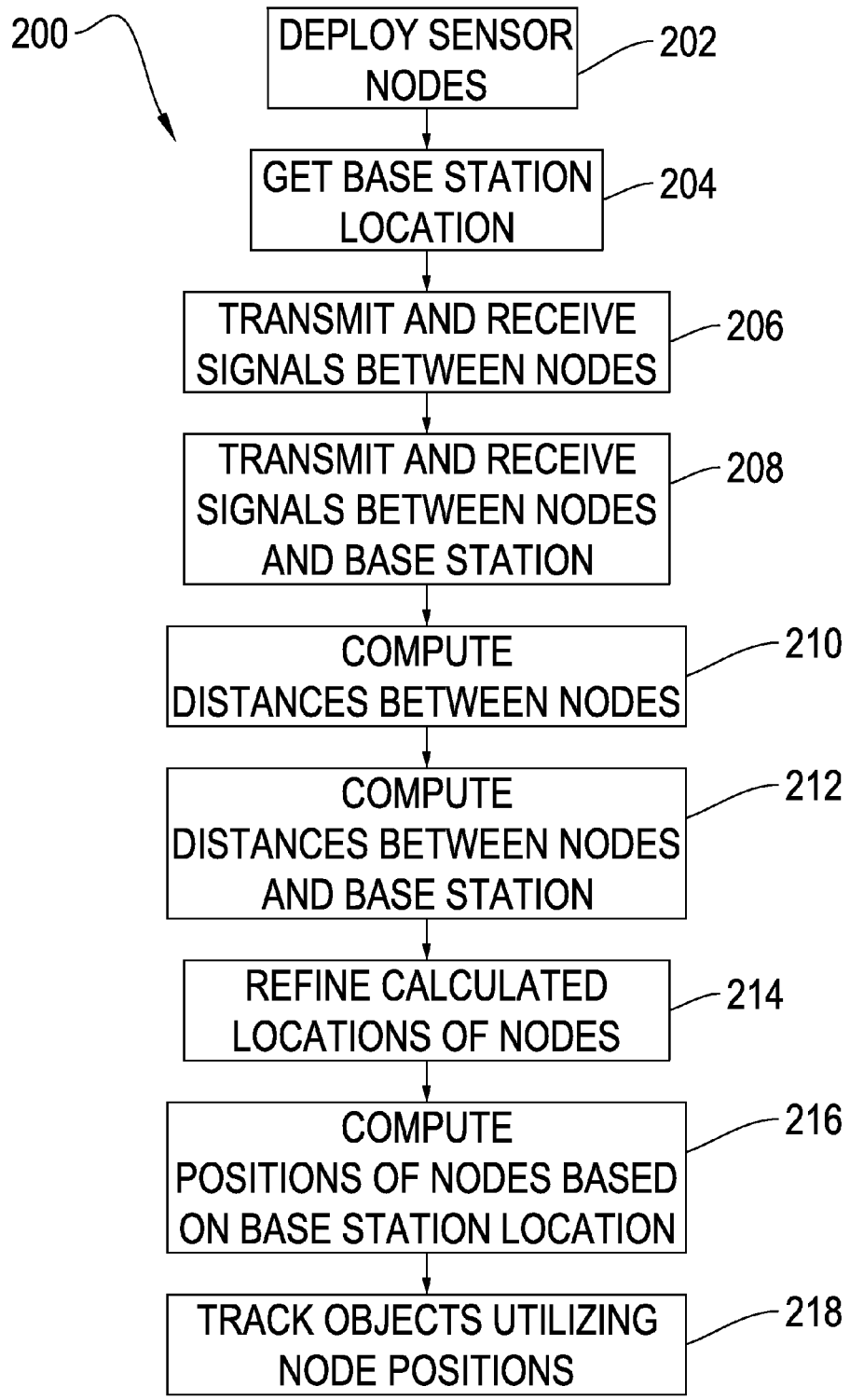
FIG. 2 illustrates a flow chart of a method of surveying portable sensor nodes according to another exemplary embodiment of the invention.

FIG. 2 provides a flow chart of an embodiment utilizing the method 200. As an initial step 202, a sensor array made up of sensor nodes such as that described in FIG. 1 is deployed. The sensor nodes can be randomly deployed in a two dimensional area. Deployment along a single line should be avoided. Times on the sensor nodes should be synchronized prior to deployment. Step 204 includes getting the base station 105 location. Typically the base station 105 location will be obtained by using a GPS receiver. Step 206 includes transmitting signals from each sensor node 110, 115, 120, and 125 and receiving the signals at at least two other nodes. During this step each transmitter associated with a node transmits an acoustic signal that includes the transmission time and its originating node. This transmission can be a simultaneous transmission at different frequencies or the transmissions can be sequenced so that only one node transmits at a time. These transmissions are received at the other nodes and a signal travel time is calculated between each originating node and each receiving node. In step 208, the base station 105 can also receive the transmitted signals from the nodes in order to calculate a signal travel time between each node and the base station. Likewise, the nodes 110, 115, 120, and 125 can receive a transmitted signal from base station 105 having its transmission time and an indication that it originated from base station 105. Because the signal transmission and reception is redundant, every transmitted signal doesn't need to be received by every node. The signal travel times can be stored at the nodes, at the base station 105 or at both locations.

Step 210 includes calculating distances of the sensor nodes 110, 115, 120, and 125 from each other. Step 212 includes computing distances between sensor nodes and the base station 105. These calculations can be made utilizing a predetermined sound velocity in the relevant acoustic medium. In some environments, such as in bodies of water, a sound velocity profile (SVP) of the acoustic environment is preferably obtained to insure accurate distance calculation. This can be performed in step 202 while the sensor nodes are being deployed. As each sensor node is deployed from the surface it will travel through the layers of the acoustic environment. For this purpose, the sensor node can have instruments such as 110D capable of measuring related parameters such as temperature, pressure and salinity. This information can be provided by the node transmitter to the base station 105 where it can be converted into a sound velocity profile. In steps 210 and 212, distances between the nodes and between the nodes and the base station are preferably stored in a database joined to base station 105.

In step 214, a computer processor such as 105A performs a base level array geometry calculation based on the distances stored in the database. This is an inverse tracking problem in which it is desired to solve for spatial relationships among the nodes and range orientation utilizing the distances between the nodes. The spatial relationship is modeled using a three dimensional spherical tracking algorithm. Basic assumptions are made about range geometry from known facts. For example, in an underwater range, the base station 105 will usually be positioned at a shallower depth than the nodes. There may be cables or other structures joined to the nodes that will constrain their positions. Often, it is known whether the bottom is flat, sloped or irregular, and these constraints can be used to give a probable range geometry. With flat bottom geometry, a two dimensional range model will greatly simplify coordinate determination.

A standard three dimensional spherical tracking algorithm utilizes the transmitting node as the unknown location. Three additional receiving nodes can be used to calculate the relative position of the transmitting node. This calculation is performed by establishing spherical equations with the distance from the transmitting node to the receiving node being the radius of the sphere. The intersection of the spherical equations for three non-collinear nodes will give the relative coordinates of the transmitting node. The process can be iterated using each node as the transmitting node and three nodes as the receiving nodes. Preferably, the three receiving nodes are the nodes nearest the transmitting node. Other data can be used to establish a probable configuration. Other spherical tracking algorithms can be used to determine these coordinates, such as the iterative Newton spherical tracking algorithm. In any case, use of these algorithms gives basic relative coordinates for each node of the sensor array.

In step 214 a gradient search algorithm is used to refine and adjust the calculated distances between the sensor nodes 110, 115, 120, and 125 and between the sensor nodes 110, 115, 120, and 125 and the base station 105. The gradient search algorithm uses distance measurements that may exist in addition to the three receiving nodes used in the base level array geometry calculation, and the gradient search algorithm solution must be over determined in order to use this method. These distances can be adjusted in an iterative procedure wherein the distances are adjusted until a predetermined error threshold is met. For example, a predetermined error threshold can be a tenth of a foot.

In the usual case, the sensor nodes provide an over-determined solution. This allows range residuals to be used to assess the relative quality of a node location estimate. The range residual is defined as the difference between the computed range from the node location estimate and the measured ranges obtained from the product of environmental sound velocity and transit time. The range residual RMS (root mean square) is defined as follows:

$$\text{Residual RMS} = \frac{\sum_{i=1}^{M} r_i}{M}; \quad (1)$$

where $r_i$ represents the i-th range residual and M is the number of detections used when computing the solution. Once a residual RMS is computed, it is compared to an RMS tolerance. The default tolerance is 0.1 feet, but it is an operator-selectable quantity. If the RMS range residual tolerance is exceeded, the solution is identified as unacceptable. As a result, one or more post-solution refinements may be applied to the solution. After all post-solution refinements have been made, if the RMS still exceeds this tolerance, the solution is rejected.

If a computed solution is deemed unsatisfactory because the RMS residual exceeds the prescribed tolerance, and the solution remains over-determined after discarding one or more detections then the "Drop Bad Detections" refinement is attempted.

In this refinement, each available detection is sequentially dropped and a new solution is computed from the remaining detections. The RMS residual is then recalculated. In other words, a total of M−1 solutions are generated, each using one less detection. Each of these solutions is then compared to the RMS range residual tolerance. If any of these solutions possesses an RMS residual that is less than the tolerance, then it is used. If such a candidate solution can be found, it is likely that the single bad measurement has been found and removed. When multiple solutions having an RMS residual that is less than the tolerance, the solution with the lowest residual can be used. In this type of "Drop Bad Detection" refinement, a single bad arrival-time measurement can be detected and removed to produce a valid solution.

If the RMS residuals for each candidate solution still exceed the tolerance then the system uses the candidate solution having the best RMS residual, and a second detection is dropped sequentially from the remaining group of detections and another set of candidate solutions is generated. The RMS residual test is then applied to each of these candidate solutions which have had two detections discarded. If any of the RMS residuals fall below the tolerance, then its corresponding solution is used. Again, if multiple solutions have an RMS residual that is less than the tolerance, the solution with the lowest residual can be used. For this type of "Drop Bad Detections" refinement, a maximum of two bad measurements can be dropped while still providing a valid solution.

In order to establish the orientation of the sensor nodes, step 216 may include planar determination of a relative location of the sensor nodes 110, 115, 120, and 125 and the base station 105 to each other based on the calculated distances of the sensor nodes 110, 115, 120, and 125 from each other, based on the distances between the sensor nodes 110, 115, 120, and 125 and the base station 105. Base station 105 operates from known latitude and longitude coordinates established by a GPS receiver or other means. This step establishes a first distance from base station 105 to the nodes 110, 115, 120, and 125. Base station 105 can then be moved to different known latitude and longitude coordinates and additional base station to node distance measurements can be taken. This establishes the orientation and coordinates of the sensor nodes 110, 115, 120, and 125.

Figure 3:
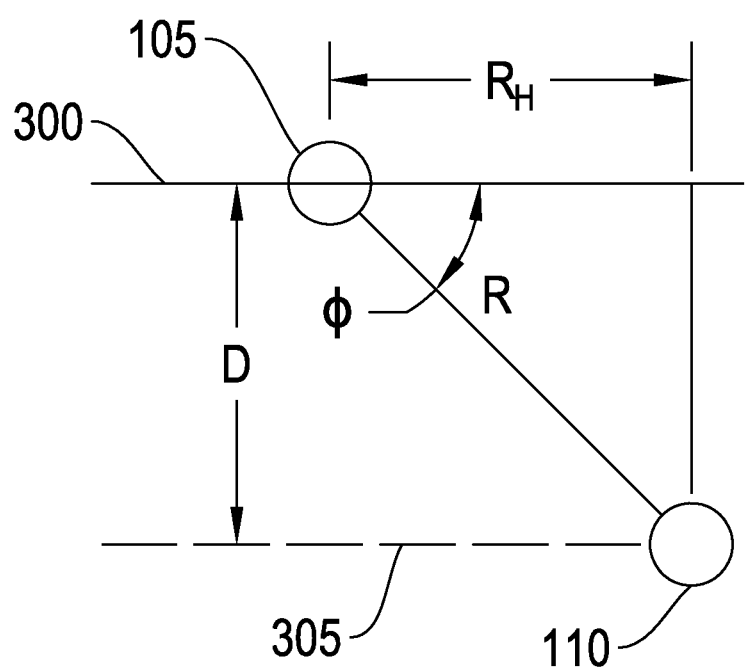
FIG. 3 illustrates a two-dimensional graphical view showing a calculation of a sound velocity for an angle of transmission of a signal from a sensor node according to the method of FIG. 2.

The steps explained below for FIG. 3 may be repeated to calculate the distance between the base station 105 and each of the sensor nodes 110, 115, 120, and 125. Determination and application of a sound velocity profile (SVP) can be used to enhance accuracy of these distances. FIG. 3 shows a diagram illustrating use of a sound velocity profile in calculating the range between base station 105 at the surface 300 and an exemplary node 110 at depth. The change in depth is given as D. The horizontal range is given as $R_H$. The range is given as R. $\phi$ is ray path angle with respect to the surface.

The sound velocity profile (SVP) documents sound velocities with respect to changes in depth. The SVP can be referenced from a database related to the location and time of the year. The SVP can also be determined by a vessel or by instruments on one of the nodes. As acoustic signals propagate, sound velocity differences cause them to bend resulting in time differences for acoustic signals being transmitted across different ocean depths. Use of the sound velocity profile is more critical for calculation of ranges between the base station 105 and the sensor nodes 110, 115, 120, and 125 because there is greater expected variation in depths along these paths. Paths among nodes are all expected to be at a small variation of depths and a single sound velocity can serve for calculation of these internodal ranges.

There are different ways to deal with the variation in sound that depend on the circumstances and the distances involved. If the sound velocity is sufficiently uniform or depths are sufficiently shallow to assure calculation of ranges within a user's tolerance, an average sound velocity can be used. Otherwise an effective sound velocity must be calculated from a sound velocity profile. The effective sound velocity is the sound velocity along the path between two nodes or the node and base station. The sound velocity profile can be referenced from a sound velocity profile database or determined experimentally. The sound velocity profile database is typically referenced by location and date based on previous measurements. The effective sound velocity is calculated using either the Vaas model or effective sound velocity look up tables. Both of these methods are known in the art and are dependent on the depth and the horizontal range between the base station and node.

Orientation of the sensor nodes can be determined by other means. These means include using a directional receiver on base station 105 that is capable of giving a bearing and azimuth to each node. Multiple receivers having a predetermined separation distance can also be positioned on base station 105. Using these multiple receivers will allow calculation of node positions and orientations without moving base station 105.

Step 218 of FIG. 2 includes using tracking software to locate objects such as an undersea vehicle after the locations of all of the sensor nodes 110, 115, 120, and 125 has been determined. Typically, tracking software as known in the art utilizes a hyperbolic tracking routine when sound emission times aren't known. In a hyperbolic tracking routine, each node receives a signal from the sound emitter at a known time. Using the known reception times, a pair of nodes can determine a hyperbolic surface. The intersection of several of these hyperbolic surfaces gives the sound emitter's location. Four hydrophones or sensors are required to provide the emitter's location. In one embodiment of the current invention each node is capable of providing the known reception time at that node as a transmitted signal for reception at the base station receiver. The base station receiver can provide these signals to the base station processor which can perform the calculations to track the emitter's location.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A self-surveying range comprising:
   a plurality of nodes, each node having a transmitter, a receiver and a processor and capable of transmitting a signal encoded with a node identifier, the transmission time and receiving transmitted signals from other nodes;
   a base station having a base station transmitter, a base station receiver and a base station processor, said base station being capable of determining its location, transmitting an encoded signal with the transmission time and receiving transmitted signals from said plurality of nodes at a definite time, said base station processor being capable of determining the location of each node from the base station location, the node transmission time and the definite reception time.

2. The system of claim 1 wherein said base station receiver is capable of receiving a first set of transmitted signals from said plurality of nodes at a definite time at a first determined location, and said base station receiver is capable of receiving a second set of transmitted signals from said plurality of nodes at a definite time at a second determined location, said first and second determined locations and said first and second sets of transmitted signals being utilized by said base station processor for determining the location of each node.

3. The system of claim 2 wherein said base station includes a global positioning system receiver joined to said base station processor and allows determination of the location of said base station.

4. The system of claim 1 wherein:
   the self-surveying range is capable of tracking a signal emitter;
   each of said plurality of nodes at said node receiver is capable of receiving a signal from the signal emitter at a definite time and transmitting the node identifier and the definite reception time to the base station; and
   said base station receiver is capable of receiving each transmitted node identifier and definite reception time and utilizing the node identifier and definite reception time with the determined location nodes to calculate a signal emitter location.

5. The system of claim 1 wherein said base station processor has a sound velocity profile stored therein and said base station processor is capable of utilizing said stored sound velocity profile to more accurately determine the location of each node.

6. The system of claim 1 wherein:
   at least one of said nodes has a instruments therein connected to the node processor, said instruments being capable of acquiring sound velocity profile data during deployment and utilizing said node transmitter to transmit sound velocity profile data to said base station for reception by said base station receiver; and
   said base station processor is capable of utilizing said received sound velocity profile to more accurately determine the location of each node.

7. A method for providing a self-surveying range comprising the steps of:
   synchronizing times among a plurality of nodes and a base station;
   deploying the plurality of nodes, each node being capable of transmitting and receiving a signal;
   providing the base station in signal communication with said deployed plurality of nodes;
   obtaining a base station location;
   transmitting an encoded signal at each node having a transmission time and a node identifier;
   receiving encoded signals at each node from other nodes in said plurality of deployed nodes;
   calculating a range between the receiving node and the other node;
   receiving encoded signals at said base station from said plurality of nodes;
   calculating a range between said base station and said plurality of deployed nodes; and
   calculating node locations based on the calculated ranges among the nodes, the ranges between said base station and said plurality of deployed nodes and said base station location.

8. The method of claim 7 further comprising:
   establishing a range residual tolerance between the measured ranges between the nodes and the ranges derived from the calculated node locations; and
   refining calculated locations of nodes by utilizing the measured ranges between nodes and ranges given by the calculated node locations to give range residuals and dropping measured ranges between nodes until the range residual tolerance is reached.

9. The method of claim 7 wherein:
   receiving encoded signals at said base station from said plurality of nodes comprises receiving encoded signals at said base station from said plurality of nodes at a first base station location;
   receiving encoded signals at said base station from said plurality of nodes comprises receiving encoded signals at said base station from said plurality of nodes at a second base station location; and
   calculating node locations based on the calculated ranges among the nodes, the ranges between said base station and said plurality of deployed nodes at said base station first location and at said base station second location.

10. The method of claim 9 wherein said first base station location and said second base station location are different known locations on said base station.

11. The method of claim 9 wherein said base station is moved from said first base station location to said second base station location.

12. The method of claim 7 wherein said step of calculating a range between said base station and said plurality of deployed nodes utilizes a sound velocity profile of the environmental water.

13. The method of claim 12 wherein said sound velocity profile is stored in the base station processor and said base station processor is capable of utilizing said stored sound velocity profile to determine the location of each node.

14. The method of claim 12 further comprising:
   gathering sound velocity profile data by at least one node during deployment; and transmitting gathered sound velocity profile data to said base station prior to the step of calculating a range between said base station and each said node.

\* \* \* \* \*